US008274503B2

(12) United States Patent
Kwon

(10) Patent No.: US 8,274,503 B2
(45) Date of Patent: Sep. 25, 2012

(54) ORGANIC LIGHT EMITTING DISPLAY AND METHOD OF DRIVING THE SAME

(75) Inventor: Oh-Kyong Kwon, Suwon (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 1148 days.

(21) Appl. No.: 12/115,716

(22) Filed: May 6, 2008

(65) Prior Publication Data

US 2009/0027377 A1 Jan. 29, 2009

(30) Foreign Application Priority Data

Jul. 27, 2007 (KR) ........................ 10-2007-0075428

(51) Int. Cl.
*G06F 3/045* (2006.01)

(52) U.S. Cl. ............................. 345/214; 345/76; 345/77

(58) Field of Classification Search .................... 345/39, 345/46, 214, 76, 77
See application file for complete search history.

(56) References Cited

U.S. PATENT DOCUMENTS 6,337,542 B1 * 1/2002 Hanaki et al. .............. 315/169.3
6,690,340 B2 * 2/2004 Sakura et al. ................... 345/46
7,180,438 B2 * 2/2007 Lin ............................... 341/144
2006/0017669 A1 1/2006 Cok et al.
2006/0244697 A1 * 11/2006 Lee et al. ......................... 345/77
2007/0046593 A1 * 3/2007 Shin ................................ 345/81
2008/0030438 A1 2/2008 Marx et al.
2008/0169460 A1 * 7/2008 Yoo ................................ 257/40

FOREIGN PATENT DOCUMENTS

EP 1 282 101 A1 2/2003
JP 2002-341825 11/2002

(Continued)

OTHER PUBLICATIONS

KIPO Notice of Allowance dated Oct. 31, 2008, for priority Korean application 10-2007-0075428 noting references listed in this IDS.

(Continued)

*Primary Examiner* — Amare Mengistu
*Assistant Examiner* — Shawna Stepp Jones
(74) *Attorney, Agent, or Firm* — Christie, Parker & Hale, LLP

(57) ABSTRACT

An organic light emitting display includes: a sensing unit for extracting degradation information of an organic light emitting diode included in each of the pixels, and for transferring a first digital value and a second digital value corresponding to the extracted degradation information to a data driver; the data driver for generating data signals corresponding to second data supplied from a timing controller during a normal driving period; a first analog-digital converter for converting the voltage corresponding to the first digital value to a fourth digital value, and for converting the voltage corresponding to the second digital value to a fifth digital value; and the timing controller for storing the fourth digital value and the fifth digital value, and for changing first data supplied from an exterior in accordance with the fourth digital value and the fifth digital value to generate the second data.

26 Claims, 9 Drawing Sheets

FOREIGN PATENT DOCUMENTS

| | | | |
|---|---|---|---|
| JP | 2004-101767 | | 4/2004 |
| JP | 2004-287345 | | 10/2004 |
| JP | 2005-156697 | | 6/2005 |
| JP | 2006-047668 | | 2/2006 |
| JP | 2007-536585 | | 12/2007 |
| KR | 10-2002-0025984 | A | 4/2002 |
| KR | 10-2006-0112993 | A | 11/2006 |
| KR | 10-2006-0128464 | | 12/2006 |
| KR | 10-2007-0005733 | A | 1/2007 |
| KR | 10-2007-0044457 | | 4/2007 |
| WO | WO 2005/015530 | A1 | 2/2005 |
| WO | WO 2006/063448 | A1 | 6/2006 |
| WO | WO 2007-037269 | A1 | 4/2007 |

OTHER PUBLICATIONS

Extended European Search Report, dated Dec. 9, 2008, in corresponding European Patent Application No. 081611785.8, indicating the relevance of the cited references in this IDS.

Korean Patent Abstracts, Publication No. 1020060128464 A; Date of Publication: Dec. 14, 2006; in the name of Jong Woung Park, et al.

Korean Patent Abstracts, Publication No. 1020070044457 A; Date of Publication: Apr. 27, 2007; in the name of Ronald Steven Cok, et al.

Office action dated Nov. 24, 2010 of Patent Application No. JP 2007-251710.

* cited by examiner

ORGANIC LIGHT EMITTING DISPLAY AND METHOD OF DRIVING THE SAME

CROSS-REFERENCE TO RELATED APPLICATION

This application claims priority to and the benefit of Korean Patent Application No. 10-2007-0075428, filed on Jul. 27, 2007, in the Korean Intellectual Property Office, the entire content of which is incorporated herein by reference.

BACKGROUND

1. Field of the Invention

The present invention relates to an organic light emitting display and a driving method thereof.

2. Description of the Related Art

Recently, various flat panel displays that have reduced weight and volume in comparison to cathode ray tubes (CRTs) have been developed. Flat panel displays include liquid crystal displays (LCDs), field emission displays (FEDs), plasma display panels (PDPs), and organic light emitting displays.

Among the flat panel displays, the organic light emitting displays make use of organic light emitting diodes that emit light by re-combination of electrons and holes. The organic light emitting display has advantages of high response speed and low power consumption.

FIG. 1 is a circuit diagram showing a pixel of a conventional organic light emitting display.

With reference to FIG. 1, a pixel 4 of an organic light emitting display includes an organic light emitting diode OLED and a pixel circuit 2. The pixel circuit 2 is coupled to a data line Dm and a scan line Sn, and controls the organic light emitting diode OLED.

An anode electrode of the organic light emitting diode OLED is coupled to the pixel circuit 2, and a cathode electrode of the organic light emitting diode OLED is coupled to a second power source ELVSS. The organic light emitting diode OLED generates light of a luminance corresponding to an electric current from the pixel circuit 2.

When a scan signal is supplied to the scan line Sn, the pixel circuit 2 controls an amount of electric current provided to the organic light emitting diode OLED corresponding to a data signal provided to the data line Dm. In order to do this, the pixel circuit 2 includes a second transistor M2', a first transistor M1', and a storage capacitor Cst'. The second transistor M2' is coupled between a first power source ELVDD and the organic light emitting diode OLED. The first transistor M1' is coupled between the data line Dm and the scan line Sn. The storage capacitor Cst' is coupled between a gate electrode and a first electrode of the second transistor M2'.

A gate electrode of the first transistor M1' is coupled to the scan line Sn, and a first electrode of the first transistor M1' is coupled to the data line Dm. A second electrode of the first transistor M1' is coupled with one terminal of the storage capacitor Cst'. Here, the first electrode is a source electrode or a drain electrode, and the second electrode is the other one of the source electrode or the drain electrode. For example, when the first electrode is the source electrode, the second electrode is the drain electrode. When a scan signal is supplied to the first transistor M1' coupled with the scan line Sn and the data line Dm, the first transistor M1' is turned on to provide a data signal from the data line Dm to the storage capacitor Cst'. At this time, the storage capacitor Cst' is charged with a voltage corresponding to the data signal.

A gate electrode of the second transistor M2' is coupled to one terminal of the storage capacitor Cst', and a first electrode of the second transistor M2' is coupled to another terminal of the storage capacitor Cst' and a first power source ELVDD. Further, a second electrode of the second transistor M2' is coupled with an anode electrode of the organic light emitting diode OLED. The second transistor M2' controls an amount of electric current flowing from the first power source ELVDD to a second power source ELVSS through the organic light emitting diode OLED according to the voltage charged in the storage capacitor Cst'. At this time, the organic light emitting diode OLED emits light corresponding to the amount of electric current supplied from the second transistor M2'.

However, the conventional organic light emitting display may not always display images of desired luminance because of an efficiency change resulting from the degradation of the organic light emitting diodes OLEDs. In practice, as time elapses, the organic light emitting diodes OLEDs are degraded. As the organic light emitting diode OLED is degraded, light of gradually decreasing luminance is generated in response to the same data signal.

SUMMARY OF THE INVENTION

Accordingly, it is an aspect of an exemplary embodiment according to the present invention to provide an organic light emitting display and a method for driving the same, which may compensate for the degradation of organic light emitting diodes. The organic light emitting display may display images having substantially uniform luminance regardless of temperature and/or resistance changes of the organic light emitting diodes.

The foregoing and/or other aspects of the present invention are achieved by providing an organic light emitting display including: pixels at crossing regions of data lines, scan lines, feedback lines, control lines, and emission control lines, each of the pixels including an organic light emitting diode; a scan driver for driving the scan lines and the emission control lines; a control line driver for driving the control lines; a sensing unit for supplying an electric current to the feedback lines during a sensing period to extract degradation information of the organic light emitting diode, and for outputting a first digital value and a second digital value corresponding to the extracted degradation information of the organic light emitting diode; a data driver for supplying voltages corresponding to the first digital value and the second digital value to the pixels during the sensing period, and for generating data signals corresponding to second data during a normal driving period (or a normal drive period); a first analog-digital converter for receiving and converting the voltage corresponding to the first digital value to a fourth digital value, and for converting the voltage corresponding to the second digital value to a fifth digital value; and a timing controller for storing the fourth digital value and the fifth digital value, and for changing externally supplied first data in accordance with the fourth digital value and the fifth digital value to generate the second data.

The data driver may include: a shift register unit including a plurality of shift registers configured to sequentially generate sampling signals; a sampling latch unit including a plurality of sampling latches configured to sequentially store the second data corresponding to the sampling signals; a holding latch unit including a plurality of holding latches configured to temporarily store the second data stored in the sampling latch unit; a signal generator including a plurality of digital-analog converters configured to generate the data signal utilizing the second data stored in the holing latch unit; and a buffer unit including a plurality of buffers configured to transfer the data signal to the data lines. The sensing unit may include: a plurality of current sources coupled to the feedback lines for supplying the electric current; a second analog-digital converter coupled to the feedback lines for converting a voltage applied to the organic light emitting diode in a pixel among the plurality of pixels to a third digital value when the electric current is supplied; and a look-up table for supplying the first digital value and the second digital value corresponding to the third digital value to a digital-analog converter coupled to the pixel among the plurality of digital-analog converters with an interval between the first digital value and the second digital value.

A current value of each of the current source may be between approximately 50 nA and approximately 50 μA. The first digital value and the second digital value may have different voltage information. The first digital value may include voltage information to be applied to an anode electrode of the organic light emitting diode to express luminance of a maximum gradation regardless of the degradation information of the organic light emitting diode. The second digital value may include first voltage information or second voltage information, the first voltage information for generating one fourth luminance of luminance corresponding to the first digital value by the organic light emitting diode, and the second voltage information generating luminance of a minimum gradation by the organic light emitting diode. The sensing unit may include: a fifth transistor disposed between each of the current sources and each of the feedback lines, and being turned on during a first period of the sensing period; a sixth transistor disposed between the second analog-digital converter and each of the feedback lines, and being turned on during the first period of the sensing period; and a seventh transistor disposed between the look-up table and the digital-analog converter, and being turned on during a second period of the sensing period.

The digital-analog converter may sequentially convert the first digital value and the second digital value to analog voltages, and supply the analog voltages to a buffer coupled to the specific pixel, during a second period of the sensing period. The buffer may include an operational amplifier, and polarities of a first input terminal and a second input terminal of the operational amplifier may be inverted. The organic light emitting display may further include: an eighth transistor disposed between the first input terminal of the operational amplifier and the digital-analog converter, and being turned on during the second period of the sensing period; a ninth transistor disposed between the second input terminal of the operational amplifier and a corresponding feedback line among the feedback lines, and turned on during the second period of the sensing period; and a tenth transistor disposed between the second input terminal and an output terminal of the operational amplifier, and turned on during the normal driving period. An output terminal voltage of the buffer may be controlled so that a voltage of the second input terminal is increased to have the same value as the analog voltages corresponding to the first and second digital values when the analog voltages are inputted to the first input terminal during the second period of the sensing period.

The first analog-digital converter may convert a voltage applied to a gate electrode of a drive transistor in the pixel to the fourth digital value corresponding to the first digital value, and convert the voltage applied to the gate electrode of the drive transistor to the fifth digital value corresponding to the second digital value. The timing controller may include: a memory for storing the fourth digital value and the fifth digital value; and a calculator for changing externally supplied first data in accordance with the fourth and fifth digital values to generate the second data. The fourth and fifth digital values of all of the plurality of pixels may be stored in the memory. The calculator may be configured to extract the fourth digital value and the fifth digital value corresponding to the pixel from the memory when the first data to be supplied to the pixel is inputted, and changes the first data to generate the second data so that a degradation of the organic light emitting diode of the pixel, and a threshold voltage and mobility of the drive transistor in the pixel are compensated.

The calculator may be configured to extract the fourth and fifth digital values from the memory when the first data to be supplied to the pixel is inputted thereto, to subtract the fourth digital value from the fifth digital value to extract mobility information and degradation compensation information of the drive transistor of the pixel, multiply the fifth digital value by two, subtract the fourth digital value from the multiplied result, and subtract a digital value of a first power source from the subtraction result to thereby extract threshold voltage information of the drive transistor. The calculator may be configured to multiply the mobility information and the degradation compensation information of the drive transistor by bit information of the first data, add the threshold voltage of the drive transistor to the multiplied result, and subtract the digital value of the first power source from the addition result, thereby generating the second data. Each of the pixels may further include: a first transistor coupled to a corresponding scan line among the scan lines and a corresponding data line among the data lines, and configured to be turned on when a scan signal is supplied to the corresponding scan line; a storage capacitor to be charged with a voltage corresponding to the data signal, wherein the drive transistor is configured to supply a current corresponding to the voltage stored in the storage capacitor from the first power source to a second power source through the organic light emitting diode; a third transistor disposed between the drive transistor and the organic light emitting diode, and configured to be turned off when an emission control signal is supplied the emission control lines; and a fourth transistor coupled between a corresponding feedback line among the feedback lines and an anode electrode of the organic light emitting diode, and configured to be turned on when a second control signal is supplied to the emission control lines. The fourth transistor may be turned on during the sensing period, and the first transistor may be turned off during a first period of the sensing period.

According to another aspect of an exemplary embodiment according to the present invention, there is provided a method for driving an organic light emitting display. The method includes: supplying an electric current from a current source to an organic light emitting diode of a pixel; converting a voltage applied to the organic light emitting diode to a third digital value corresponding to the electric current and applying the third digital value to a look-up table; sequentially converting a first digital value and a second digital value corresponding to the third digital value from the look-up table to analog voltages, and transferring the analog voltages to the pixel; converting a voltage applied to a gate electrode of a drive transistor of the pixel to a fourth digital value corresponding to the first digital value, and converting a voltage applied to the gate electrode of the driver transistor to a fifth digital value corresponding to the second digital value, and storing the fourth and fifth digital values; and extracting the fourth and fifth digital values from the memory when first data to be supplied to the pixel is inputted, and generating second data to compensate for degradation of the organic light emitting diode, and a mobility and a threshold voltage of the drive transistor.

A current value of the current source may be between approximately 50 nA and approximately 50 μA. The first digital value may be set to compensate for degradation of the organic light emitting diode corresponding to the third digital value. The first digital value may include voltage information, which is applied to an anode electrode of the organic light emitting diode to express luminance of a maximum gradation regardless of the degradation of the organic light emitting diode. The second digital value may include voltage information different from that of the first digital value. The second digital value may include voltage information to generate one fourth luminance of luminance corresponding to the first digital value or to generate luminance of a minimum gradation by the organic light emitting diode.

BRIEF DESCRIPTION OF THE DRAWINGS

These and/or other embodiments and features of the invention will become apparent and more readily appreciated from the following description of certain exemplary embodiments, taken in conjunction with the accompanying drawings of which.

DETAILED DESCRIPTION OF EXEMPLARY EMBODIMENTS

Figure 1:
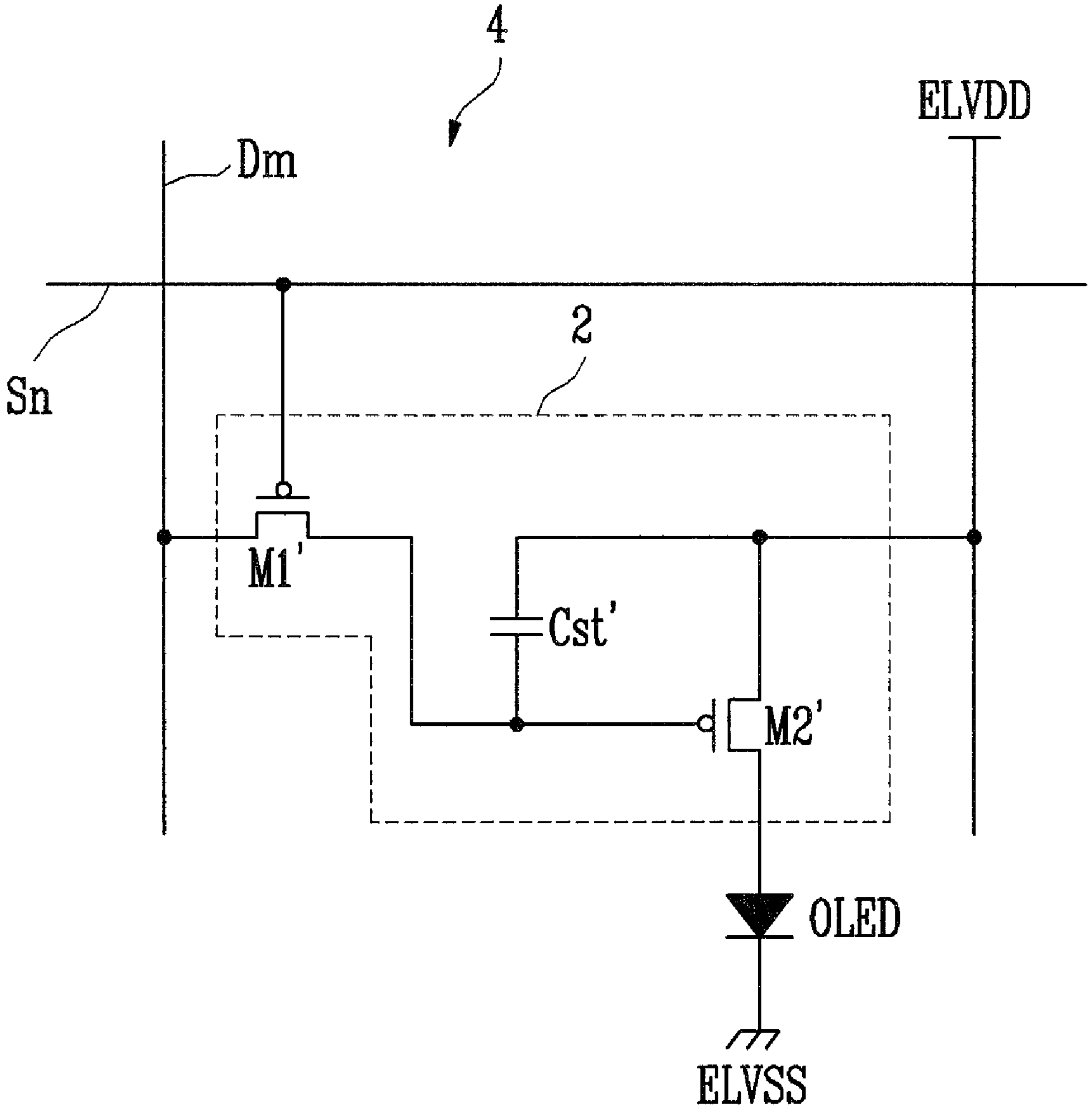
FIG. 1 (PRIOR ART)
FIG. 1 is a circuit diagram of a pixel of a conventional organic light emitting display.

Hereinafter, certain exemplary embodiments according to the present invention will be described with reference to the accompanying drawings. Here, when a first element is described as being coupled to a second element, the first element may be directly coupled to the second element, or may be indirectly coupled to the second element via a third element. Further, some of the elements that are not essential to the complete understanding of the invention are omitted for clarity. Also, like reference numerals refer to like elements throughout.

Hereinafter, exemplary embodiments of the present invention will be described with reference to FIG. 2 to FIG. 7.

Figure 2:
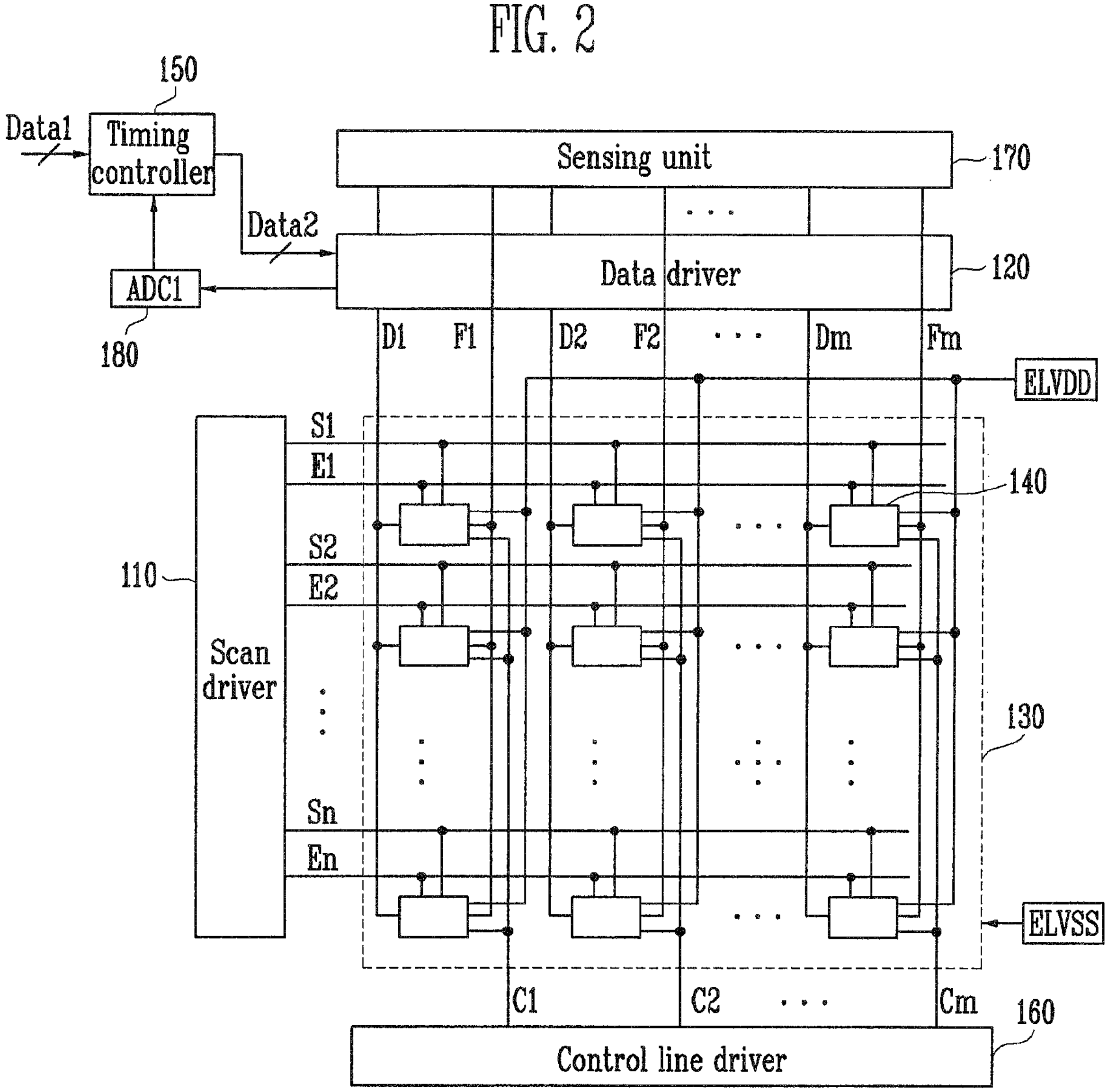
FIG. 2 is a block diagram showing an organic light emitting display according to an embodiment of the present invention.

FIG. 2 is a block diagram showing an organic light emitting display according to an embodiment of the present invention. While FIG. 2 shows a sensing unit 170 and a data driver 120 as two separate components, in practice, they can be formed on a single chip together.

With reference to FIG. 2, the organic light emitting display according to the embodiment of the present invention includes a display region 130 including pixels 140, a scan driver 110, a control line driver 160, a data driver 120, and a timing controller 150. The pixels 140 are coupled to scan lines S1 through Sn, emission control lines E1 through En, data lines D1 through Dm, feedback lines F1 through Fm, and control lines C1 to Cm. The scan driver 110 drives the first scan lines S1 through Sn and the emission control lines E1 through En. The control line driver 160 drives the control lines C1 through Cm. The data driver 120 drives the data lines D1 through Dm. The timing controller 150 controls the scan driver 110, the control line driver 160, and the data driver 120.

The organic light emitting display according to the described embodiment of the present invention further includes a sensing unit 170 and a first analog-digital converter 180 (referred to as 'ADC1' hereinafter). The sensing unit 170 is coupled with the feedback lines F1 through Fm, and extracts degradation information of the organic light emitting diode OLED included in each of the pixels 140. The ADC1 180 converts the degradation information of the organic light emitting diode extracted by the sensing unit 170 to a digital signal, and transfers the digital signal to the timing controller 150.

The display region 130 includes the pixels 140, which are disposed at crossing regions of the scan lines S1 through Sn, the emission control lines E1 through En, the data lines D1 through Dm, the feedback lines F1 through Fm, and the control lines C1 through Cm. The pixels 140 charge a voltage (e.g., a predetermined voltage) corresponding to a data signal, and supply an electric current corresponding to the charged voltage to the organic light emitting diode to generate light of corresponding luminance (e.g., predetermined luminance). To do this, each of the pixels 140 is coupled to a first power source ELVDD and a second power source ELVSS. In the described embodiment, the second power source ELVSS has a voltage that is lower than that of the first power source ELVDD.

The scan driver 110 supplies a scan signal to the scan lines S1 through Sn under a control of the timing controller 150. Further, the scan driver 110 supplies an emission control signal to the emission control lines E1 through En under a control of the timing controller 150.

The control line driver 160 supplies a control signal to the control lines C1 through Cm under a control of the timing controller 150. Here, the control line driver 160 sequentially supplies a control signal to the control lines C1 through Cm so that pixels 140 positioned on the same horizontal line can be coupled to the sensing unit 170 at different times.

The sensing unit 170 extracts a voltage applied to the organic light emitting diode, namely, degradation information of the organic light emitting diode, while supplying a current (e.g., predetermined current) to the organic light emitting diode included in each of the pixels 140. Further, the sensing unit 170 supplies a first digital value and a second digital value to the data driver 120 according to the extracted voltage.

The data driver 120 supplies a data signal to the data lines D1 through Dm under a control of the timing controller 150 during a normal driving period. Further, the data driver 120 sequentially converts the first digital value and the second digital value supplied from the sensing unit 170 to analog voltages during the sensing period, and provides the analog voltages to the pixels 140. At this time, the data driver 120 provides a voltage applied to a gate electrode of a drive transistor of the pixel 140 to the ADC1 180.

The ADC1 180 converts a voltage supplied from the data driver 120 to a fourth digital value corresponding the first digital value, and converts the voltage supplied from the data driver 120 to a fifth digital value corresponding the second digital value, during the sensing period. Next, the ADC1 180 provides the fourth digital value and the fifth digital value to the timing controller 150.

The timing controller 150 controls the scan driver 110, the data driver 120, and the control line driver 160. Further, the timing controller 150 changes a bit value of an externally provided first data Data1 using the fourth and fifth digital values supplied from the ADC1 180 to generate a second data Data2. The bit value of the second data Data2 is set so that the degradation of an organic light emitting diode included in a pixel 140 to receive a data signal corresponding to the second data Data2 and a mobility and a threshold voltage of a drive transistor in the pixel 140 can be compensated. The second data Data2 generated by the timing controller 150 is supplied to the data driver 120. When the data driver 120 receives the second data Data2, it generates a data signal and provides it to the pixels 140.

Figure 3:
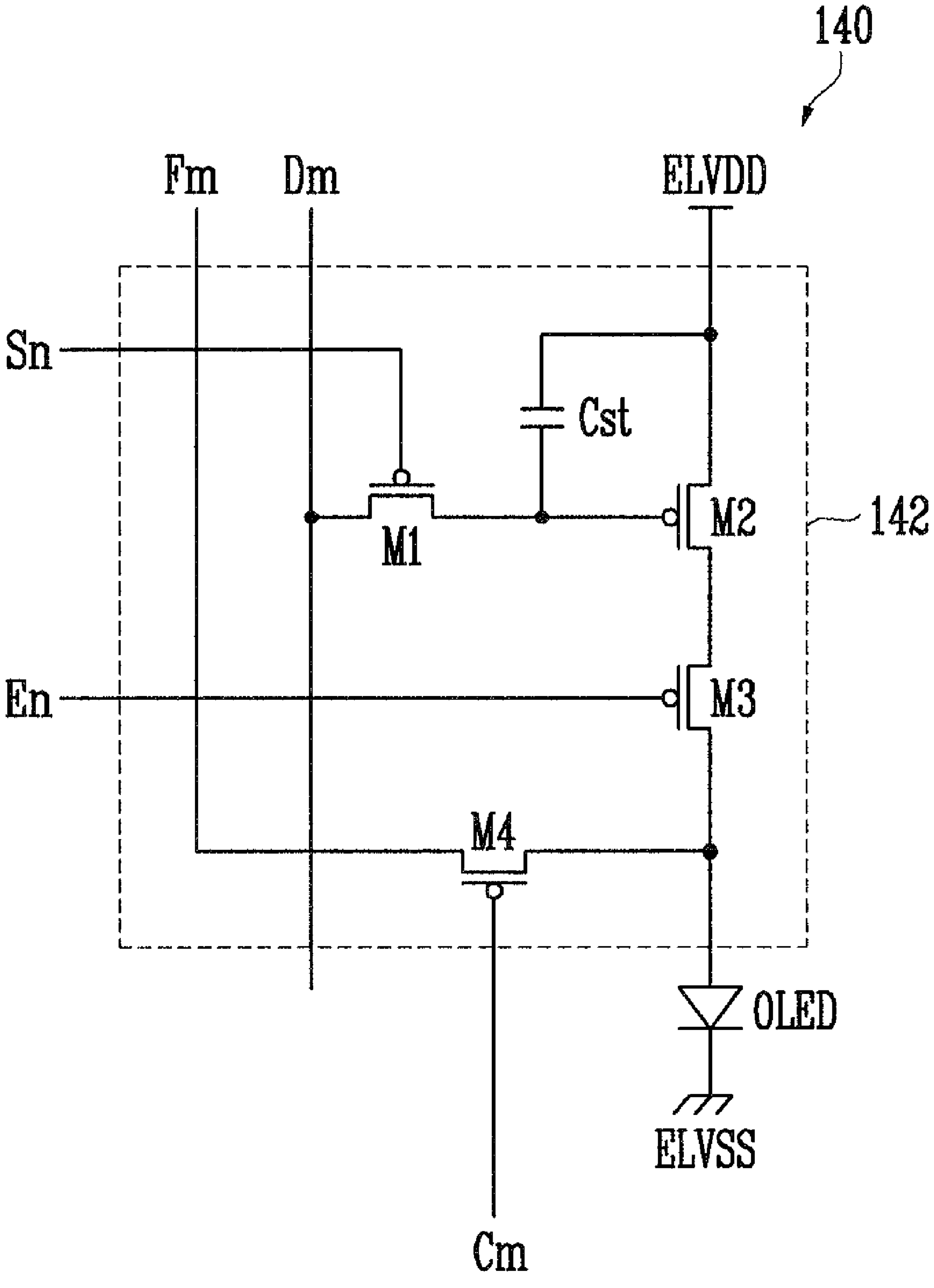
FIG. 3 is a circuit diagram showing one example of the pixel shown in FIG. 2.

FIG. 3 is a circuit diagram showing an example of the pixel shown in FIG. 2. For the convenience of description, FIG. 3 shows the pixel 140 coupled to the m-th data line Dm and the n-th scan line Sn.

With reference to FIG. 3, the pixel 140 according to the described embodiment of the present invention includes an organic light emitting diode OLED and a pixel circuit 142. The pixel circuit 142 supplies an electric current to the organic light emitting diode OLED.

An anode electrode of the organic light emitting diode OLED is coupled with the pixel circuit 142, and a cathode electrode of the organic light emitting diode OLED is coupled with the second power source ELVSS. The organic light emitting diode OLED generates light of a luminance (e.g., a predetermined luminance) corresponding to an electric current from the pixel circuit 142.

The pixel circuit 142 provides degradation information of the organic light emitting diode OLED to the sensing unit 170 during a first period of a sensing period. Further, the pixel circuit 142 provides a voltage applied to a gate electrode of the second transistor M2 to the ADC1 180 through a data line Dm during a second period of the sensing period. To do this, the pixel circuit 142 includes four transistors M1 through M4, and a storage capacitor Cst.

A gate electrode of the first transistor M1 is coupled with the scan line Sn, and a first electrode of the first transistor M1 is coupled with a data line Dm. A second electrode of the first transistor M1 is coupled with a first terminal of the storage capacitor Cst. The first transistor M1 is turned on when a scan signal is supplied to the scan line Sn (i.e., when the scan signal has a low level).

A gate electrode of the second transistor M2 is coupled to the first terminal of the storage capacitor Cst, and a first electrode of the second transistor M2 is coupled to a second terminal of the storage capacitor Cst. Further, a second electrode of the second transistor M2 is coupled with a first electrode of the third transistor M3. The second transistor M2 provides an electric current corresponding to a voltage stored in the storage capacitor Cst to the organic light emitting diode OLED.

A gate electrode of the third transistor M3 is coupled with an emission control line En, and a first electrode of the third transistor M3 is coupled with the second electrode of the second transistor M2. Further, a second electrode of the third transistor M3 is coupled with the organic light emitting diode OLED. When the emission control signal is supplied to the emission control line En (i.e., when the emission control signal has a high level), the third transistor M3 is turned off. In contrast to this, when the emission control signal is not supplied to the emission control line En (i.e., when the emission control signal has a low level), the third transistor M3 is turned on.

A gate electrode of the fourth transistor M4 is coupled to the control line Cm, and a first electrode of the fourth transistor M4 is coupled to an anode electrode of the organic light emitting diode OLED. Further, a second electrode of the fourth transistor M4 is coupled to a feedback line Fm. The fourth transistor M4 is turned on when a control signal is supplied to the control line Cm.

Figure 4:
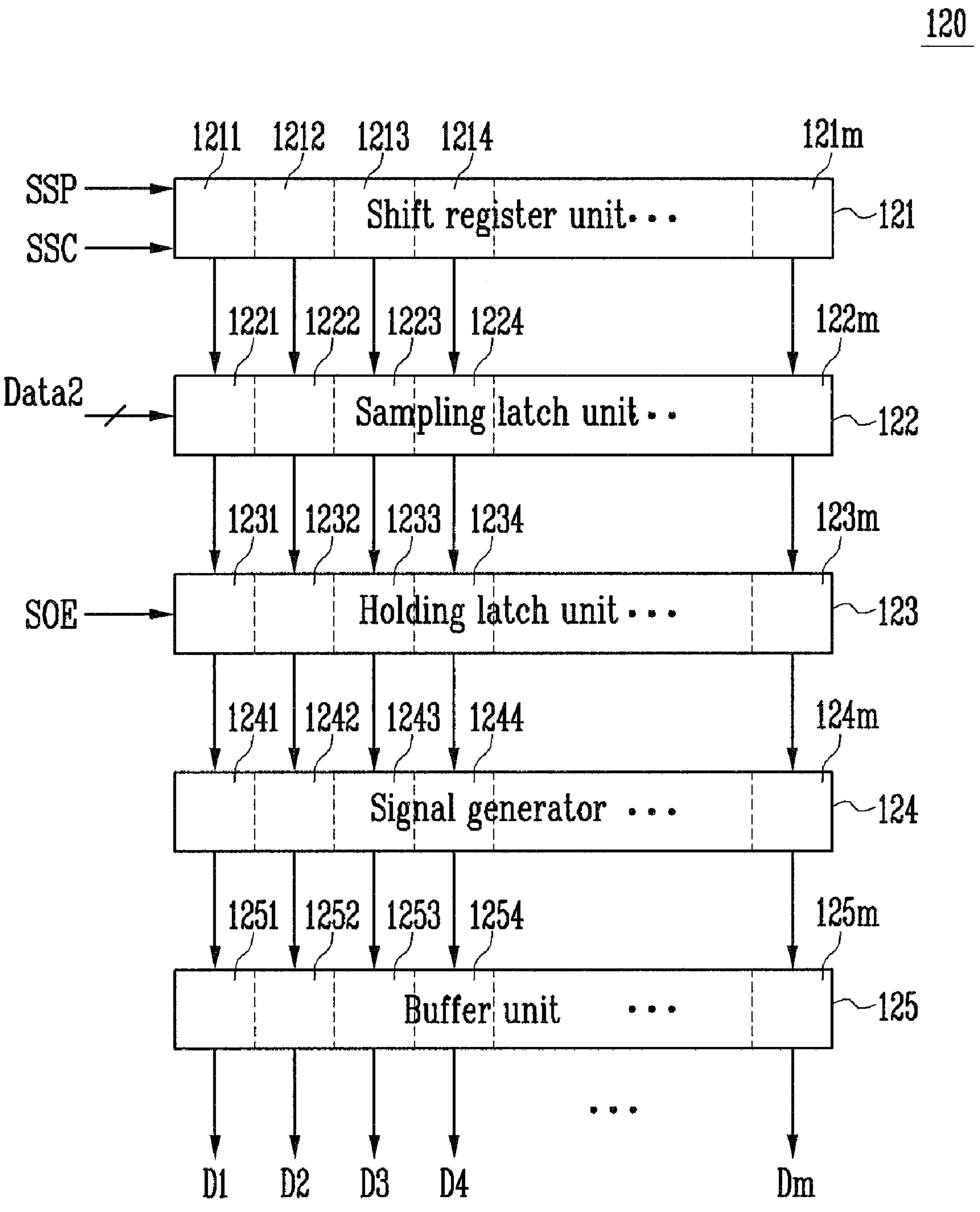
FIG. 4 is a block diagram showing one example of the data driver shown in FIG. 2.

FIG. 4 is a block diagram showing the data driver shown in FIG. 2. With reference to FIG. 4, the data driver 120 includes a shift register unit 121, a sampling latch unit 122, a holding latch unit 123, a signal generator 124, and a buffer unit 125.

The shift register unit 121 receives a source start pulse SSP and a source shift clock SSC from a timing controller 150. When the shift register unit 121 receives the source start pulse SSP and the source shift clock SSC, it sequentially outputs m sampling signals while shifting the source start pulse SSP every period of the source shift clock SSC. In order to do this, the shift register unit 121 includes m shift registers 1211 through 121*m*.

The sampling latch unit 122 sequentially stores second data Data2 in response to the sampling signals, which are sequentially supplied from the shift register unit 121. In order to do this, the sampling latch unit 122 includes m sampling latches 1221 through 122*m* to store m second data Data2.

The holding latch unit 123 receives a source output enable signal SOE from the timing controller 150. When the holding latch unit 123 receives a source output enable signal SOE, it receives and stores data Data from the sampling latch unit 122. Further, the holding latch unit 123 supplies the data Data stored therein to the signal generator 124. To do this, the holding latch unit 123 includes m holding latches 1231 through 123*m*.

The signal generator 124 receives the second data Data2 from the holding latch unit 123, and generates m data signals corresponding to the received second data Data2. In order to do this, the signal generator 124 includes m digital-analog converters (referred to as "DAC") 1241 through 124*m*. That is, the signal generator 124 generates m data signals using the DACs 1241 through 124*m* positioned at respective channels, and provides the m data signals to the buffer unit 125.

Further, each of the DACs 1241 through 124*m* is coupled with the sensing unit 170. The DACs 1241 through 124*m* convert a voltage supplied from the sensing unit 170 to an analog voltage, and provide the analog voltage to the buffer unit 125.

The buffer unit 125 provides the m data signals from the signal generator 124 to m data lines D1 through Dm. To do this, the buffer unit 125 includes m buffers 1251 through 125*m*. In one exemplary embodiment, the m buffers 1251 through 125*m* are constructed by an operational amplifier. In the described embodiment, a polarity of input terminals of the operational amplifier can be inverted according to a control signal (not shown). That is, a polarity of a positive polarity input terminal can be inverted to a polarity of a negative polarity input terminal, and a polarity of a negative polarity input terminal can be inverted to a polarity of the positive polarity input terminal. Further, the operational amplifier functions as a comparator or a buffer according to a turning-on/off of a switch (not shown).

Figure 5:
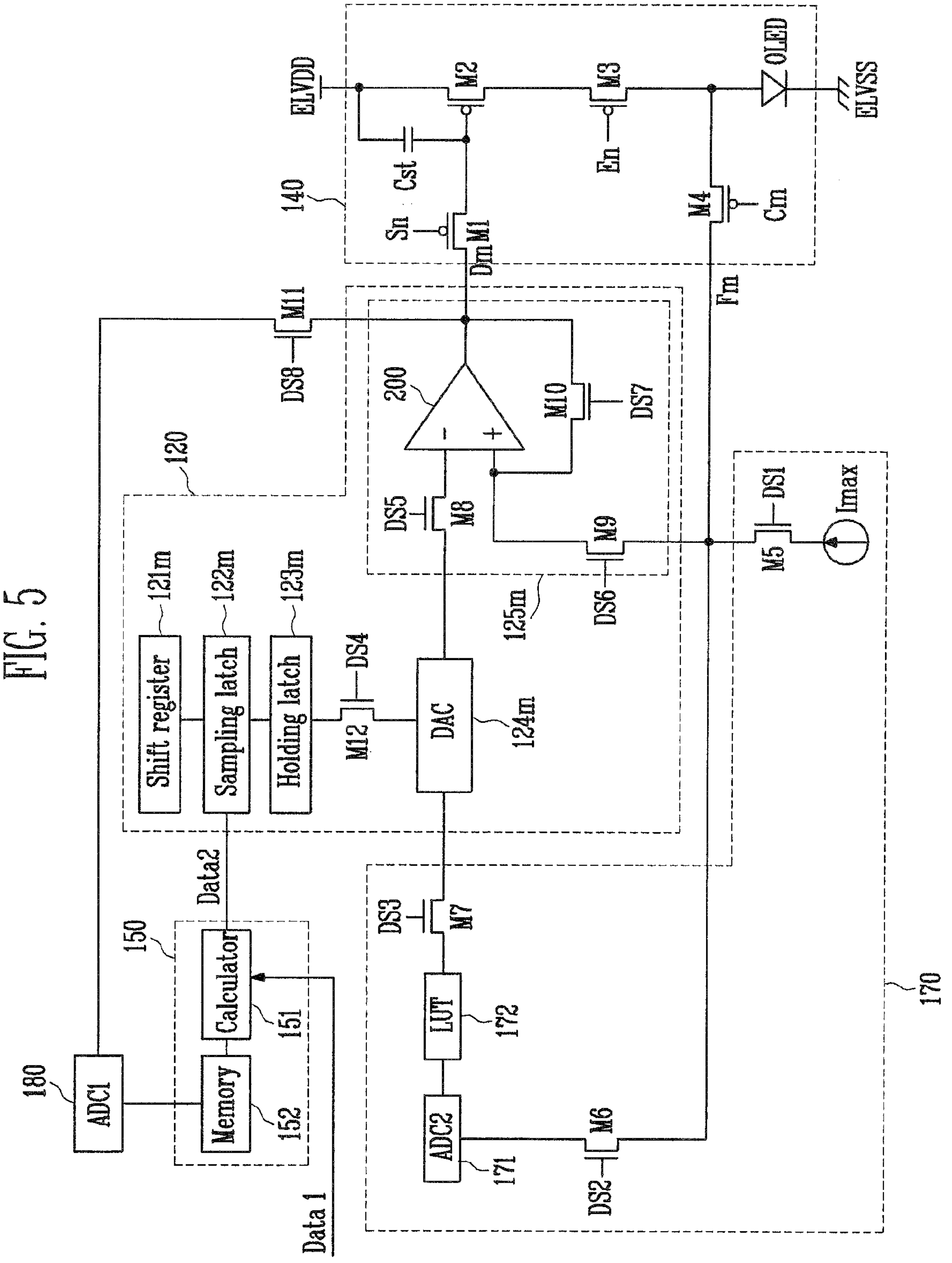
FIG. 5 is a schematic diagram showing a connected construction of the sensing unit, the data driver, the timing controller, and the pixel shown in FIG. 2.

FIG. 5 is a schematic diagram showing a connected construction of the sensing unit 170, the data driver 120, the timing controller 150, and one of the pixels 140 shown in FIG. 2.

With reference to FIG. 5, the sensing unit 170 includes a current source Imax, a second analog-digital converter (referred to as "ADC2" hereinafter) 171, and a look up table (referred to as "LUT" hereinafter) 172.

The current source Imax is coupled to each of the feedback lines F1 through Fm, and supplies an electric current (e.g., a predetermined electric current) to the organic light emitting diode OLED. Here, the electric current supplied from the current source Imax to the organic light emitting diode OLED is experimentally determined so that degradation information of the organic light emitting diode OLED may be sufficiently extracted. In practice, the electric current supplied from the current source Imax to the organic light emitting diode OLED is determined by a size and a resolution of a panel. For example, the electric current supplied from the current source Imax to the organic light emitting diode OLED may be set to range from 50 nA to 50 μA.

A fifth transistor M5 is located between the current source Imax and the organic light emitting diode OLED. The fifth transistor M5 is turned on during a first period of the sensing period.

The ADC2 171 is coupled to the feedback lines F1 through Fm in common. When an electric current from the current source Imax is supplied to the ADC2 171, it converts a voltage applied to the organic light emitting diode OLED to a third digital value, and provides the third digital value to the LUT 172. A sixth transistor M6 is located between the ADC2 171 and the organic light emitting diode OLED. The sixth transistor M6 is turned on during the first period of the sensing period. Here, the ADC2 171 and the LUT 172 are coupled to all channels in common.

The LUT 172 transfers a first digital value and a second digital value to the DAC 124*m* at an interval (e.g., a predetermined interval) corresponding to a third digital value supplied from the ADC2 171. In more detail, the third digital value supplied from the ADC2 171 to the LUT 172 includes degradation information of the organic light emitting diode OLED. In other words, when an electric current from the current source Imax is supplied to the organic light emitting diode OLED, a voltage applied to the organic light emitting diode OLED increases as degradation of the organic light emitting diode OLED progresses. Accordingly, the third digital value supplied from the ADC2 171 to the LUT 172 includes degradation information of the organic light emitting diode OLED.

The LUT 172 provides the first digital value and the second digital value to the DAC 124*m* at an interval (e.g., a predetermined interval) corresponding to the third digital value supplied from the ADC2 171. Here, the first digital value compensates for the degradation of the organic light emitting diode OLED. The second digital value has voltage information that is different from that of the first digital value. Here, the first digital value is set as a value corresponding to a voltage, which is applied to an anode electrode of the organic light emitting diode OLED degraded, to compensate for the degradation of the organic light emitting diode OLED. For example, the first digital value may be set as a value corresponding to a voltage, which may express luminance of a maximum gradation by the degraded organic light emitting diode OLED. Accordingly, the first digital value includes voltage information to be applied to an anode electrode of the organic light emitting diode OLED, namely, to be increased in order to compensate for a reduction of an emission efficiency in the organic light emitting diode OLED corresponding to the third digital value.

The second digital value includes voltage information that is lower than that of the first digital value. For example, the second digital value is set as a value corresponding to voltage information capable of generating one fourth the luminance of the luminance corresponding to the first digital value or a voltage capable of expressing luminance of a minimum gradation by the organic light emitting diode OLED. Hereinafter, for the convenience of description, it is assumed that the second digital value includes voltage information capable of generating one fourth the luminance of the luminance corresponding to the first digital value.

In one embodiment, the first digital values and the second digital values are experimentally and previously stored in the LUT 172. In other words, the first digital values and the second digital values are previously stored in the LUT 172 through various experiments so that degradation of the organic light emitting diode OLED can be compensated corresponding to various third digital values supplied from the ADC2 171.

A seventh transistor M7 is located between the LUT 172 and the DAC 124*m*. The seventh transistor M7 is turned on during a second period of the sensing period.

The buffer 125*m* is constructed using an operational amplifier 200. A polarity of input terminals of the operational amplifier 200 is inverted according to an external control signal.

An eighth transistor M8 is located between a first input terminal of the operational amplifier 200 and the DAC 124*m*. The eighth transistor M8 is turned on during the second period of the sensing period.

A ninth transistor M9 is located between a second input terminal of the operational amplifier 200 and the organic light emitting diode OLED. The ninth transistor M9 is turned on during the second period of the sensing period.

The second input terminal of the operational amplifier 200 is coupled with a first terminal of a tenth transistor M10, and an output terminal of the operational amplifier 200 is coupled with a second terminal of the tenth transistor M10. The tenth transistor M10 is turned off during the sensing period, but is turned on during a normal driving period.

A twelfth transistor M12 is located between the holding latch 123*m* and the DAC 124*m*. The twelfth transistor M12 is turned on during the normal driving period, but is turned off during the sensing period.

The timing controller 150 includes a memory 152 and a calculator 151. The memory 152 stores the fourth digital value and the fifth digital value supplied from the ADC1 180. The calculator 151 generates and provides a second data Data2 to the data driver 120 using the fourth digital value and the fifth digital value stored in the memory 152. Here, the second data Data2 is obtained by changing a bit value of the first data Data1.

Figure 6A:
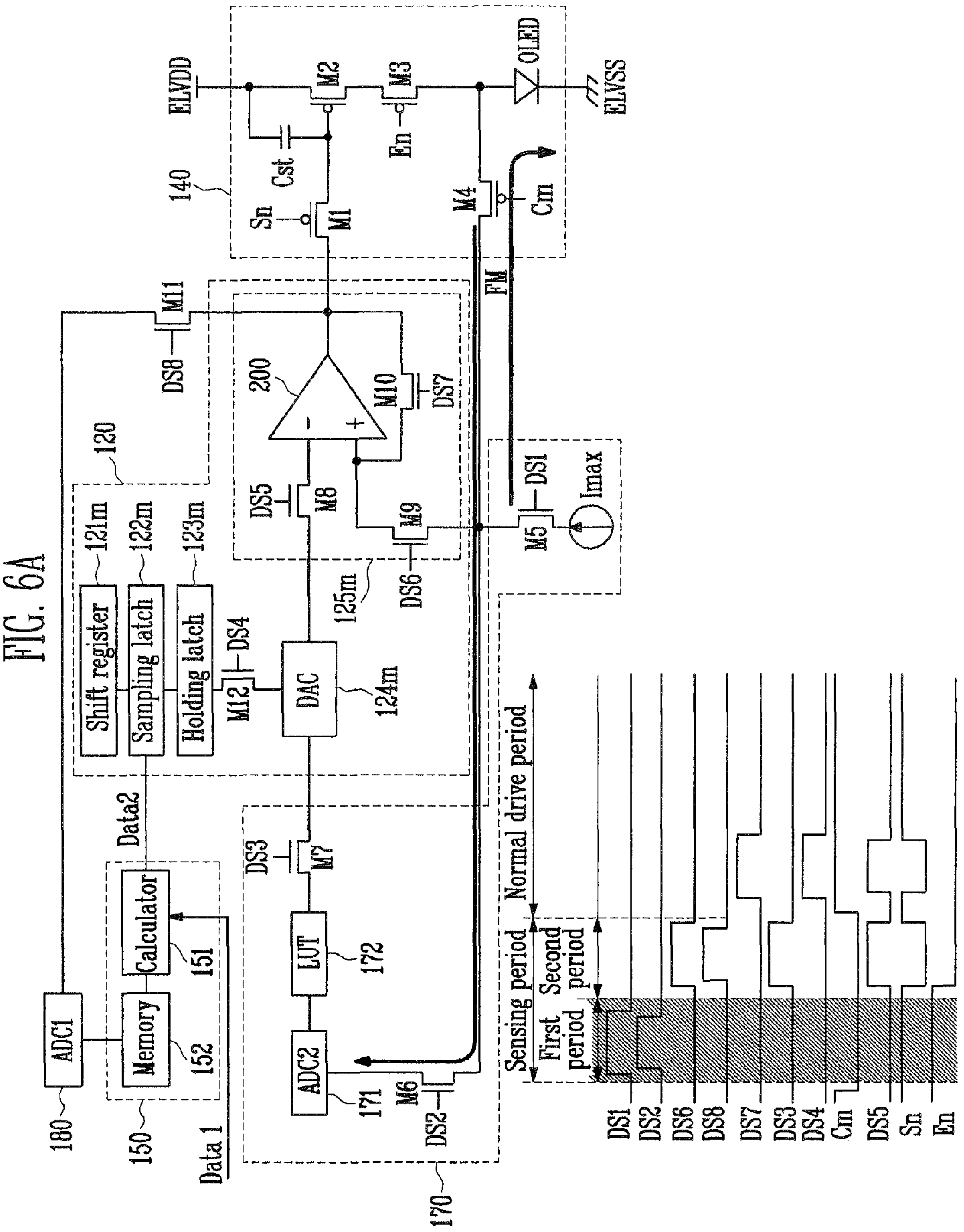
FIG. 6A through FIG. 6C are schematic diagrams that illustrate a method for driving an organic light emitting display in association with a drive waveform.
Figure 6B:
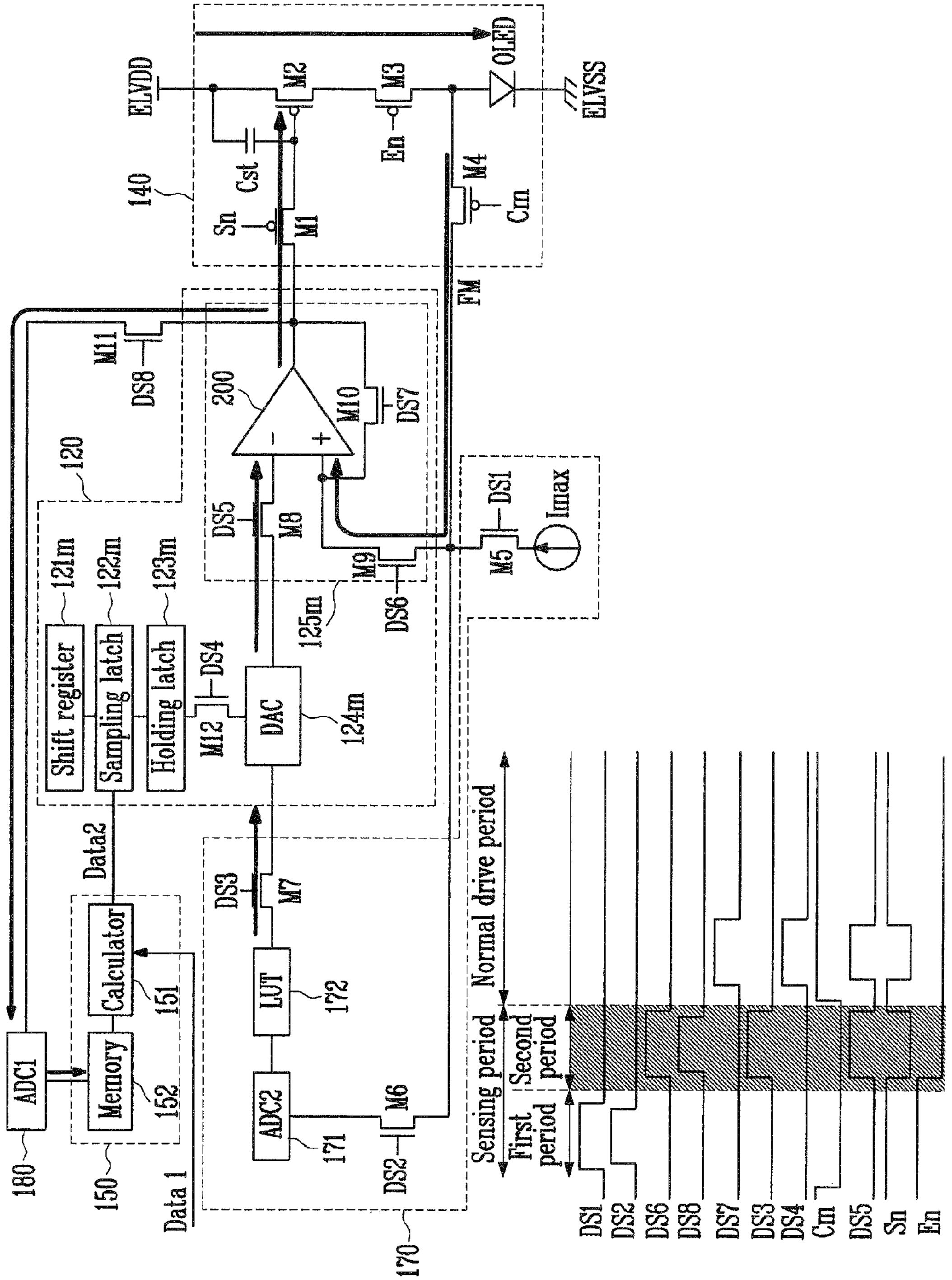
Figure 6C:
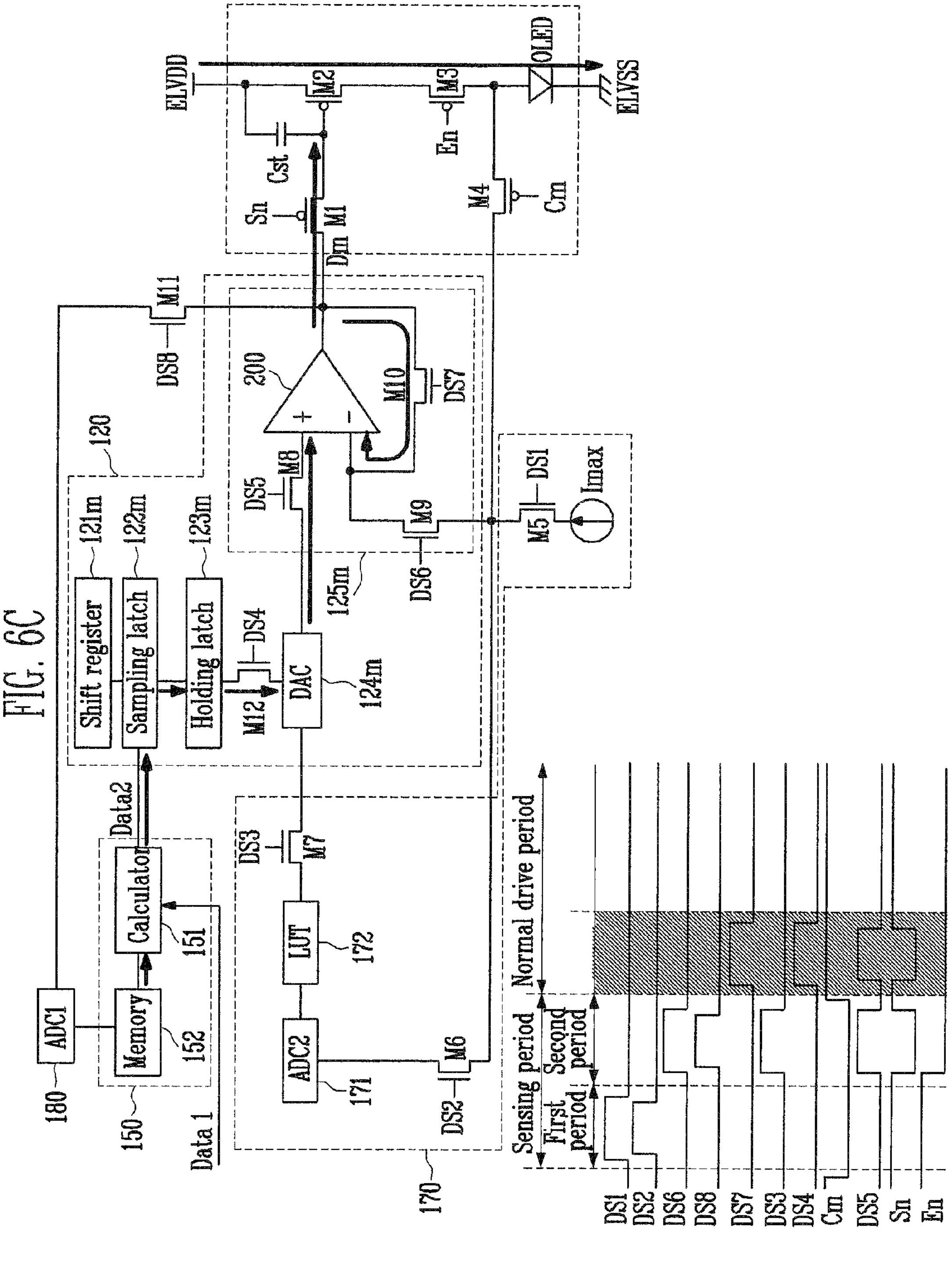

FIG. 6A through FIG. 6C are schematic diagrams for illustrating a method for driving an organic light emitting display in association with a drive waveform.

FIG. 6A through FIG. 6C, for the convenience of description, show the pixel 140 coupled to an n-th scan line Sn and an m-th data line Dm.

Referring to FIG. 6A, during the first period of the sensing period, a first drive signal DS1, a second drive signal DS2, an emission control signal, and a control signal (a low level signal) are supplied.

When the first drive signal DS1 is supplied, the fifth transistor M5 is turned on. When the second drive signal DS2 is supplied, the sixth transistor M6 is turned on. When an emission control signal is supplied to an n-th emission control line En, the third transistor M3 is turned off. When a control signal is supplied to a control line Cm, the fourth transistor M4 is turned on.

When the fifth transistor M5 and the fourth transistor M4 are turned on, an electric current from the current source Imax is supplied to a second power source ELVSS through the organic light emitting diode OLED. In this case, a voltage (e.g., a predetermined voltage) corresponding to the current of the current source Imax is applied to the organic light emitting diode OLED.

The voltage applied to the organic light emitting diode OLED is supplied to the ADC2 171 through the sixth transistor M6. The ADC2 171 converts the voltage applied to the organic light emitting diode OLED to a third digital value, and transfers the third digital value to the LUT 172.

Next, as shown in FIG. 6B, during a second period of the sensing period, a third drive signal DS3, a fifth drive signal DS5, a sixth drive signal DS6, an eighth drive signal DS8, a scan signal (a low level signal), and a control signal (a low level signal) are supplied.

When the third drive signal DS3 is supplied, the seventh transistor M7 is turned on. When the fifth drive signal DS5 is supplied, the eighth transistor M8 is turned on. When the sixth drive signal DS6 is supplied, the ninth transistor M9 is turned on. When the eighth drive signal DS8 is supplied, an eleventh transistor M11 is turned on. When the scan signal is supplied, the first transistor M1 is turned on. When the control signal is supplied, the fourth transistor M4 is turned on.

When the seventh transistor M7 is turned on, the first digital value and the second digital value extracted from the LUT 172 corresponding to the third digital value are sequentially supplied to the DAC 124*m* at an interval (e.g., a predetermined interval). The DAC 124*m* converts the first digital value and the second digital value to analog voltages, and provides the analog voltages to the operational amplifier 200.

When a voltage supplied from the DAC 124*m* is provided to the first input terminal (−) of the operational amplifier 200, a voltage of the second input terminal (+) of the operational amplifier 200 is increased to become identical (or substantially identical) with a voltage of the first terminal (−). Accordingly, a voltage applied to a gate electrode of the second transistor M2 is set as the voltage of a second terminal (+) that is identical (or substantially identical) with the voltage of the first terminal (−). That is, a voltage capable of compensating for the degradation of the organic light emitting diode OLED is applied to a gate electrode of the second transistor M2. The ADC1 180 converts the voltage applied to the gate electrode of the second transistor M2 to a fourth digital value and a fifth digital value, and provide the fourth digital value and the fifth digital value to the memory 152.

Here, when a voltage corresponding to the first digital value is applied from the DAC 124*m*, the voltage applied to the gate electrode of the second transistor M2 can be expressed by the following Equation 1.

$$\text{Vdata\_max} = ELVDD - \sqrt{\frac{\alpha 2 I_{max}}{\mu_{M2} Cox \frac{W}{L}}} - |V_{thM2}| \quad \text{Equation 1}$$

In the Equation 1, Vdata_max represents a voltage applied to a gate electrode of the second transistor M2 corresponding to the first digital value, and a represents a value to determine an increased amount of electric current corresponding to the degradation of the organic light emitting diode OLED. For example, when emission efficiency is reduced from 100% to 75% by the degradation of the organic light emitting diode OLED, the value a becomes 100/75. In the described embodiment, the value α is previously determined by the first digital value so the degradation of the organic light emitting diode OLED can be compensated. Further, in the Equation 1, μ represents mobility of the second transistor M2, Cox is a capacitance in an oxide layer of the second transistor M2, W is a channel width of the second transistor M2, L is a channel length of the second transistor M2, and $V_{th}$ represents a threshold voltage of the second transistor M2.

When a voltage corresponding to the second digital value is applied from the DAC 124*m*, the voltage applied to a gate electrode of the second transistor M2 may be expressed by a the following Equation 2.

$$\text{Vdata\_min} = ELVDD - \frac{1}{2}\sqrt{\frac{\alpha 2 I_{max}}{\mu_{M2} Cox \frac{W}{L}}} - |V_{thM2}| \quad \text{Equation 2}$$

The applied voltage corresponding to the first digital value is converted to the fourth digital value, and the fourth digital value is stored in the memory 152. Further, the applied voltage corresponding to the second digital value is converted to a fifth digital value, and the fifth digital value is stored in the memory 152.

During the sensing period, an operation shown in FIG. 6A and FIG. 6B repeats to convert degradation information of all the pixels 140 to the fourth digital value and the fifth digital value. The fourth and fifth digital values are stored in the memory 152. For example, after degradation information of a pixel 140 coupled with the first scan line S1 and the first data line D1 is sensed, degradation information of a pixel 140 coupled with the first scan line S1 and the second data line D2 may be sensed. In practice, during the sensing period, all the pixels 140 perform operations of the first and second periods as shown in FIG. 6A and FIG. 6B.

The sensing period takes place at a point in time where a power is supplied to the organic light emitting display. Accordingly, when the power is inputted to the organic light emitting display, degradation information of pixels 140 is stored in the memory 152. Next, during a normal driving period shown in FIG. 6C, the second data Data2 is generated using the degradation information stored in the memory 152.

During the normal driving period, the first data Data1 is supplied to the calculator 151. At this time, the calculator 151 generates a second data Data2 by changing a bit value of the first data Data1 using the fourth digital value and the fifth digital value from a specific pixel 140 to which the first data Data1 will be supplied.

The following is a generation procedure of the second data Data2 in more detail. Firstly, when the first data Data1 to be supplied to the specific pixel 140 is inputted, the fourth digital value and the fifth digital value corresponding to the specific pixel 140 are extracted from the memory 152.

Next, the calculator 151 subtracts the fourth digital value from the fifth digital value. When the fourth digital value is subtracted from the fifth digital value, information expressed by the following Equation 3 is obtained.

$$\text{Vdata\_min} - \text{Vdata\_max} = \frac{1}{2}\sqrt{\frac{\alpha 2 I_{max}}{\mu_{M2} Cox \frac{W}{L}}} \quad \text{Equation 3}$$

As indicated in the Equation 3, when the fourth digital value is subtracted from the fifth digital value, mobility information and degradation information a to be compensated of the second transistor M2 remain.

Further, as indicated in the Equation 4 below, the calculator 151 multiplies the fifth digital value by two, subtracts the fourth digital value from the multiplying result, and subtracts the first power source ELVDD (value converted to a digital signal) from the subtraction result to obtain a threshold voltage of the second transistor M2.

$$ELVDD-2\times V\text{data\_min}-V\text{data\_max}=|V_{thM2}| \quad \text{Equation 4}$$

Next, the calculator 151 multiplies the result of the Equation 3 by bit information (e.g., a number of bits) of the first data Data1 as indicated in the Equation 5 below, and adds the threshold voltage of the second transistor M2 to the multiplication result. Next, the calculator 151 subtracts a digital value of the first power source ELVDD from the addition result to generate the second data Data2.

$$Data2 = ELVDD - \sqrt{4\left(\frac{x}{2^n-1}\right)}\,\frac{1}{2}\sqrt{\frac{\alpha 2I_{max}}{\mu_{M2}Cox\frac{W}{L}}} - |V_{thM2}| \quad \text{Equation 5}$$

$$= ELVDD - \sqrt{\left(\frac{x}{2^n-1}\right)\frac{\alpha 2I_{max}}{\mu_{M2}Cox\frac{W}{L}}} - |V_{thM2}|$$

In the Equation 5, n represents a number of bits of the first data Data1, x represents a gradation selected by the bits of the first data Data1. For example, when the first data Data1 has 8 bits and a value of 25 (i.e., the gray level of 25), n is set as 8 and x is selected as 25.

In the Equation 5, the second data Data2 includes bit information of the first data Data1, a threshold voltage and mobility information of the second transistor M2, and degradation information of the organic light emitting diode OLED. In other words, the second data Data2 is generated using the number of bits of Data1, the value of Data1, the threshold voltage and mobility information of the second transistor M2, and degradation information of the organic light emitting diode OLED.

The second data Data2 generated by the calculator 151 is stored in a sampling latch 122*m*. The second data Data2 stored in the sampling latch 122*m* is supplied to a holding latch 123*m*. Meanwhile, during the normal driving period shown in FIG. 6C, a fourth drive signal DS4, a fifth drive signal DS5, a seventh drive signal DS7, and the scan signal (a low level signal) are supplied.

When the fourth drive signal DS4 is supplied, the twelfth transistor M12 is turned on. When the fifth drive signal DS5 is supplied, the eighth transistor M8 is turned on. When the seventh drive signal DS7 is supplied, the tenth transistor M10 is turned on. Further, during the normal driving period corresponding to a control signal supplied to the operational amplifier 200, the first input terminal is set as a positive polarity terminal (+), and the second input terminal is set as a negative polarity terminal (−). At this time, because the tenth transistor M10 is set in a turned-on state, the operational amplifier 200 operates as a buffer.

Since the twelfth transistor M112 is set in a turned-on state, the second data Data2 is supplied to the DAC 124*m*. At this time, the DAC 124*m* converts the second data Data2 to a data signal (analog signal) and provides the data signal to the operational amplifier 200.

The data signal supplied to the operational amplifier 200 is provided and stored in a storage capacitor Cst of a pixel 140 selected by a scan signal supplied to the scan line Sn. Next, the second transistor M2 provides an electric current corresponding to a voltage stored in the storage capacitor Cst to the organic light emitting diode OLED.

At this time, the voltage charged in the storage capacitor Cst is set as a voltage, which may compensate for degradation of the organic light emitting diode OLED, a threshold voltage and mobility of the second transistor M2. Accordingly, the organic light emitting diode OLED may generate light of desired luminance corresponding to an electric current supplied from the second transistor M2.

Meanwhile, FIG. 2 shows control lines C1 through Cm formed in parallel with the data lines D1 through Dm. However, the present invention is not limited thereto.

Figure 7:
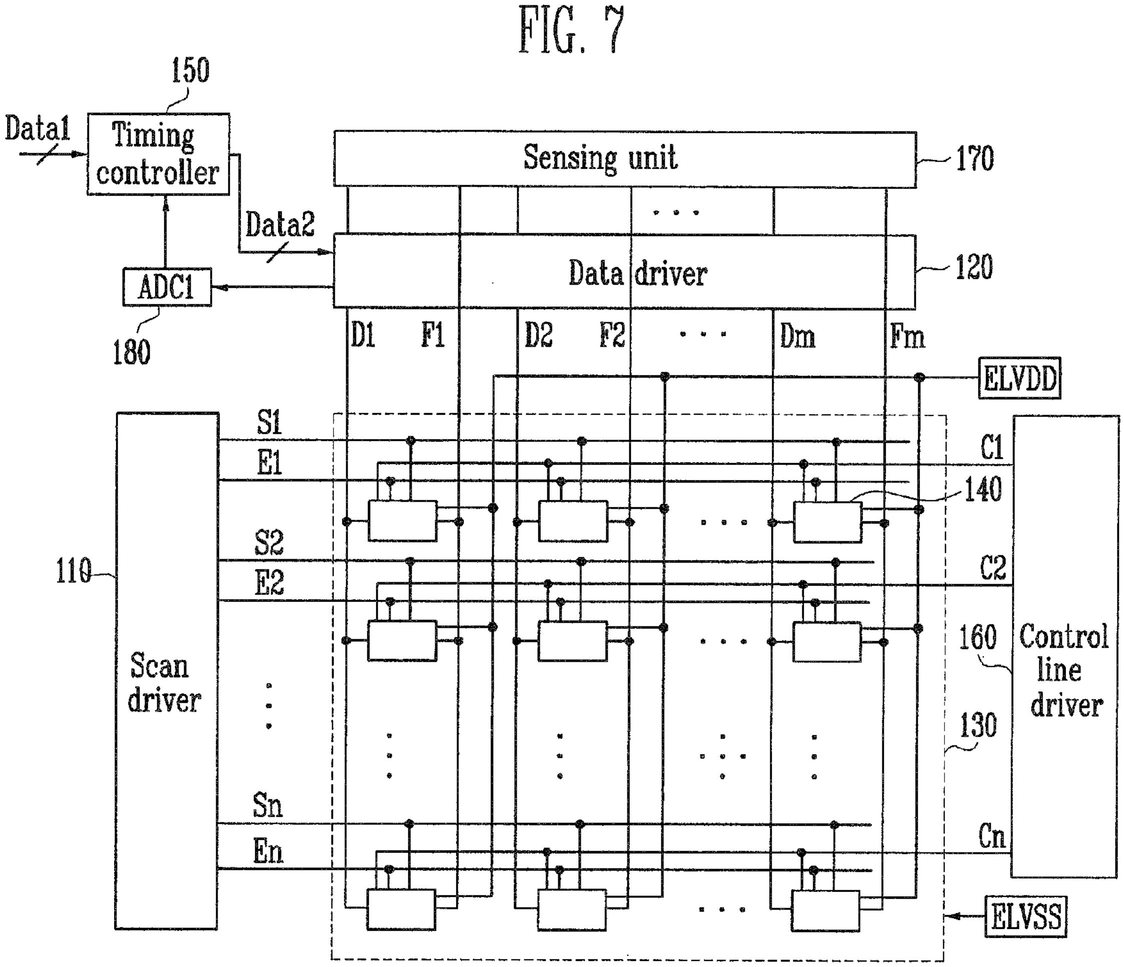
FIG. 7 is a block diagram showing an organic light emitting display according to another embodiment of the present invention.

In other words, as shown in FIG. 7 for example, the control lines C1 through Cn may be formed in parallel with the scan lines S1 through Sn. In this case, during the sensing period, a control signal is sequentially supplied to the control lines C1 through Cn. Each time the control signal is supplied, the sixth transistor M6 located in each channel is sequentially turned on to sense degradation information of the organic light emitting diode OLED.

As is seen from the forgoing description, in the organic light emitting display and a method for driving the same, a voltage applied to a gate electrode of a drive transistor is converted to a fourth digital value and a fifth digital value corresponding to extracted information, and they are stored in a memory. Next, a bit value of data is changed using the fourth digital value and the fifth digital value stored in the memory to compensate for degradation of an organic light emitting diode, and a threshold voltage and mobility of a drive transistor. Accordingly, embodiments of the present invention may display images of desired luminance regardless of the degradation of the organic light emitting diode, and the threshold voltage and mobility of a drive transistor.

Although exemplary embodiments of the present invention have been shown and described, it would be appreciated by those skilled in the art that changes might be made in these embodiments without departing from the principles and spirit of the invention, the scope of which is defined in the claims and their equivalents.

What is claimed is:

1. An organic light emitting display comprising:

pixels at crossing regions of data lines, scan lines, feedback lines, control lines, and emission control lines, each of the pixels comprising an organic light emitting diode;

a scan driver for driving the scan lines and the emission control lines;

a control line driver for driving the control lines;

a sensing unit for supplying an electric current to the feedback lines during a sensing period to extract degradation information of the organic light emitting diode, and for outputting a first digital value and a second digital value corresponding to the extracted degradation information of the organic light emitting diode;

a data driver for supplying voltages corresponding to the first digital value and the second digital value to the pixels during the sensing period, and for generating data signals corresponding to second data during a normal driving period;

a first analog-digital converter for receiving and converting the voltage corresponding to the first digital value to a fourth digital value, and for receiving and converting the voltage corresponding to the second digital value to a fifth digital value; and a timing controller for storing the fourth digital value and the fifth digital value, and for changing externally supplied first data in accordance with the fourth digital value and the fifth digital value to generate the second data.

2. The organic light emitting display as claimed in claim 1, wherein the data driver comprises:

a shift register unit comprising a plurality of shift registers configured to sequentially generate sampling signals;

a sampling latch unit comprising a plurality of sampling latches configured to sequentially store the second data corresponding to the sampling signals;

a holding latch unit comprising a plurality of holding latches configured to temporarily store the second data stored in the sampling latch unit;

a signal generator comprising a plurality of digital-analog converters configured to generate the data signal utilizing the second data stored in the holding latch unit; and a buffer unit comprising a plurality of buffers configured to transfer the data signal to the data lines.

3. The organic light emitting display as claimed in claim 2, wherein the sensing unit comprises:

a plurality of current sources coupled to the feedback lines for supplying the electric current;

a second analog-digital converter coupled to the feedback lines for converting a voltage applied to the organic light emitting diode in a pixel among the pixels to a third digital value when the electric current is supplied; and a look-up table for supplying the first digital value and the second digital value corresponding to the third digital value to a digital-analog converter coupled to the pixel among the plurality of digital-analog converters with an interval between the first digital value and the second digital value.

4. The organic light emitting display as claimed in claim 3, wherein a current value of each of the current sources is between approximately 50 nA and approximately 50 μA.

5. The organic light emitting display as claimed in claim 3, wherein the first digital value and the second digital value have different voltage information.

6. The organic light emitting display as claimed in claim 5, wherein the first digital value comprises voltage information to be applied to an anode electrode of the organic light emitting diode to express luminance of a maximum gradation regardless of the degradation information of the organic light emitting diode.

7. The organic light emitting display as claimed in claim 5, wherein the second digital value comprises first voltage information or second voltage information, the first voltage information for generating one fourth of luminance corresponding to the first digital value by the organic light emitting diode, and the second voltage information for generating luminance of a minimum gradation by the organic light emitting diode.

8. The organic light emitting display as claimed in claim 3, wherein the sensing unit comprises:

a fifth transistor between each of the current sources and each of the feedback lines, and being turned on during a first period of the sensing period;

a sixth transistor between the second analog-digital converter and each of the feedback lines, and being turned on during the first period of the sensing period; and a seventh transistor between the look-up table and the digital-analog converter, and being turned on during a second period of the sensing period.

9. The organic light emitting display as claimed in claim 3, wherein the digital-analog converter sequentially converts the first digital value and the second digital value to analog voltages, and supplies the analog voltages to a buffer coupled to the specific pixel, during a second period of the sensing period.

10. The organic light emitting display as claimed in claim 9, wherein the buffer comprises an operational amplifier, and polarities of a first input terminal and a second input terminal of the operational amplifier are inverted.

11. The organic light emitting display as claimed in claim 10, further comprising:

an eighth transistor between the first input terminal of the operational amplifier and the digital-analog converter, and turned on during the second period of the sensing period;

a ninth transistor between the second input terminal of the operational amplifier and a corresponding feedback line among the feedback lines, and turned on during the second period of the sensing period; and a tenth transistor between the second input terminal and an output terminal of the operational amplifier, and being turned on during the normal driving period.

12. The organic light emitting display as claimed in claim 10, wherein an output terminal voltage of the buffer is controlled so that a voltage of the second input terminal is increased to have the same value as the analog voltages corresponding to the first and second digital values when the analog voltages are inputted to the first input terminal during the second period of the sensing period.

13. The organic light emitting display as claimed in claim 12, wherein the first analog-digital converter converts a voltage applied to a gate electrode of a drive transistor in the pixel to the fourth digital value corresponding to the first digital value, and converts the voltage applied to the gate electrode of the drive transistor to the fifth digital value corresponding to the second digital value.

14. The organic light emitting display as claimed in claim 13, wherein the timing controller comprises:

a memory for storing the fourth digital value and the fifth digital value; and a calculator for changing the externally supplied first data in accordance with the fourth and fifth digital values to generate the second data.

15. The organic light emitting display as claimed in claim 14, wherein the fourth and fifth digital values of all of the pixels are stored in the memory.

16. The organic light emitting display as claimed in claim 14, wherein the calculator is configured to extract the fourth digital value and the fifth digital value corresponding to the pixel from the memory when the first data to be supplied to the pixel is inputted, and changes the first data to generate the second data so that a degradation of the organic light emitting diode of the pixel, and a threshold voltage and mobility of the drive transistor in the pixel, are compensated.

17. The organic light emitting display as claimed in claim 16, wherein the calculator is configured to extract the fourth and fifth digital values from the memory when the first data to be supplied to the pixel is inputted thereto; to subtract the fourth digital value from the fifth digital value to extract mobility information and degradation compensation information of the drive transistor of the pixel; multiply the fifth digital value by two, subtract the fourth digital value from the multiplied result, and subtract a digital value of a first power source from the subtraction result to thereby extract threshold voltage information of the drive transistor.

18. The organic light emitting display as claimed in claim 17, wherein the calculator is configured to multiply the mobility information and the degradation compensation information of the drive transistor by bit information of the first data, add the threshold voltage of the drive transistor to the multiplied result, and subtract the digital value of the first power source from the addition result, thereby generating the second data.

19. The organic light emitting display as claimed in claim 17, wherein each of the pixels further comprises:

a first transistor coupled to a corresponding scan line among the scan lines and a corresponding data line among the data lines, and configured to be turned on when a scan signal is supplied to the corresponding scan line;

a storage capacitor to be charged with a voltage corresponding to the data signal, wherein the drive transistor is configured to supply a current corresponding to the voltage stored in the storage capacitor from the first power source to a second power source through the organic light emitting diode;

a third transistor between the drive transistor and the organic light emitting diode, and configured to be turned off when an emission control signal is supplied the emission control lines; and a fourth transistor between a corresponding feedback line among the feedback lines and an anode electrode of the organic light emitting diode, and configured to be turned on when a second control signal is supplied to the emission control lines.

20. The organic light emitting display as claimed in claim 19, wherein the fourth transistor is turned on during the sensing period, and the first transistor is turned off during a first period of the sensing period.

21. A method of driving an organic light emitting display, comprising:

supplying an electric current from a current source to an organic light emitting diode of a pixel;

converting a voltage applied to the organic light emitting diode to a third digital value corresponding to the electric current and applying the third digital value to a look-up table;

sequentially converting a first digital value and a second digital value corresponding to the third digital value from the look-up table to analog voltages, and transferring the analog voltages to the pixel;

converting a voltage applied to a gate electrode of a drive transistor of the pixel to a fourth digital value corresponding to the first digital value, and converting a voltage applied to the gate electrode of the driver transistor to a fifth digital value corresponding to the second digital value, and storing the fourth and fifth digital values; and extracting the fourth and fifth digital values from the memory when first data to be supplied to the pixel is inputted, and generating second data to compensate for degradation of the organic light emitting diode, and a mobility and a threshold voltage of the drive transistor.

22. The method as claimed in claim 21, wherein a current value of the current source is between approximately 50 nA and approximately 50 μA.

23. The method as claimed in claim 21, wherein the first digital value is set to compensate for degradation of the organic light emitting diode corresponding to the third digital value.

24. The method as claimed in claim 23, wherein the first digital value comprises voltage information, which is applied to an anode electrode of the organic light emitting diode to express luminance of a maximum gradation regardless of the degradation of the organic light emitting diode.

25. The method as claimed in claim 23, wherein the second digital value comprises voltage information different from that of the first digital value.

26. The method as claimed in claim 25, wherein the second digital value comprises voltage information to generate one fourth of luminance corresponding to the first digital value or to generate luminance of a minimum gradation by the organic light emitting diode.

* * * * *

(12) SUPPLEMENTAL EXAMINATION CERTIFICATE

United States Patent (10) Number: US 8,274,503 F1

Kwon (45) Certificate Issued: Jan. 21, 2016

Control No.: 96/000,115 Filing Date: Dec. 1, 2015

Primary Examiner: Henry Tran

No substantial new question of patentability is raised in the request for supplemental examination. See the Reasons for Substantial New Question of Patentability Determination in the file of this proceeding.

(56) Items of Information

U.S. PATENT DOCUMENTS

| | | |
|---|---|---|
| US 2003/0057895 A1 | 3/2003 | Kimura |

FOREIGN PATENT DOCUMENTS

| | | |
|---|---|---|
| EP | 0905673 | 3/1999 |